Feb. 25, 1964 W. A. McGAHAN 3,122,374
SEAL FOR ROTATING SHAFT WITH PRESSURE RESPONSIVE MEANS
Filed Aug. 17, 1961 3 Sheets-Sheet 1

INVENTOR
WALLACE A. McGAHAN
BY
Arthur Frederick
HIS ATTORNEY

INVENTOR
WALLACE A. McGAHAN
BY
*Arthur Frederick*
HIS ATTORNEY

United States Patent Office 3,122,374
Patented Feb. 25, 1964

3,122,374
SEAL FOR ROTATING SHAFT WITH PRESSURE RESPONSIVE MEANS
Wallace A. McGahan, Phillipsburg, N.J., assignor to Ingersoll-Rand Company, New York, N.Y., a corporation of New Jersey
Filed Aug. 17, 1961, Ser. No. 132,142
4 Claims. (Cl. 277—27)

This invention relates to seals and is primarily concerned with shaft seals for rotating machinery, such as compressors, pumps, and the like.

In the past it has been the practice to use floating ring seals. The faultiness of these seals is that they have high leakage rates of fluid toward the interior of the casing particularly when the shaft is not rotating since they must be subjected to fluid pressures at all times whether the apparatus is in operation or shut down.

Accordingly, it is an object of the present invention to provide a shaft seal for a rotating shaft which provides an effective seal against leakage of fluid when the shaft is stationary as well as when the shaft is rotating.

It is another object of this invention to provide a shaft seal for a rotating shaft in which wear of the component parts thereof is negligible.

It is a further object of this invention to provide a shaft seal for a rotating shaft which effectively prevents fluid leakage in either direction along the shaft.

The present invention, therefore, contemplates a novel shaft seal for a rotating shaft which comprises means forming with a ring means connected to the shaft for conjoined rotation with the latter, a sealing fluid receiving chamber surrounding a portion of the shaft projecting from a housing, the receiving chamber being in communication with a source of sealing fluid under a pressure above the fluid pressure within the housing. The ring means includes a seal face surrounding the shaft. A second ring means is fixedly mounted adjacent the first mentioned ring means to define with the latter a passageway. The adjacent surfaces of the first and second ring means defining the passageway are so formed that, upon rotation of the shaft and the first ring means, a hydrodynamic pressure is exerted upon a fluid in the passageway equal to or greater than the fluid pressure in the housing to thereby provide a fluid seal around the shaft. A contact ring having a contact face portion is supported for slidable movement toward and away from the seal face of the first ring means. A biasing means is provided to constantly urge the contact face of the contact ring in fluid tight abutment against the seal face of the first ring means. The contact face portion is provided with a plurality of depressions which form, with the seal face of the first mentioned means, a plurality of chambers. Passage means is provided for communicating the chambers formed by the depressions and the seal face with sealing fluid under pressure in the sealing fluid receiving chamber. The depressions are so formed as to cause, upon rotation of the shaft and the first ring means, a hydrodynamic force component in the fluid in the chambers acting on the contact ring in a direction to overcome the biasing means to thereby cause the contact ring to slide away from the seal face of the first seal ring. Second passage means is provided for communicating the depressions with the passageway forming the fluid seal so that the fluid seal functions to prevent flow of sealing fluid from the sealing fluid receiving chamber into the housing.

The invention will be more fully understood from the following description when considered in connection with the accompanying drawings in which.

Figure 1:
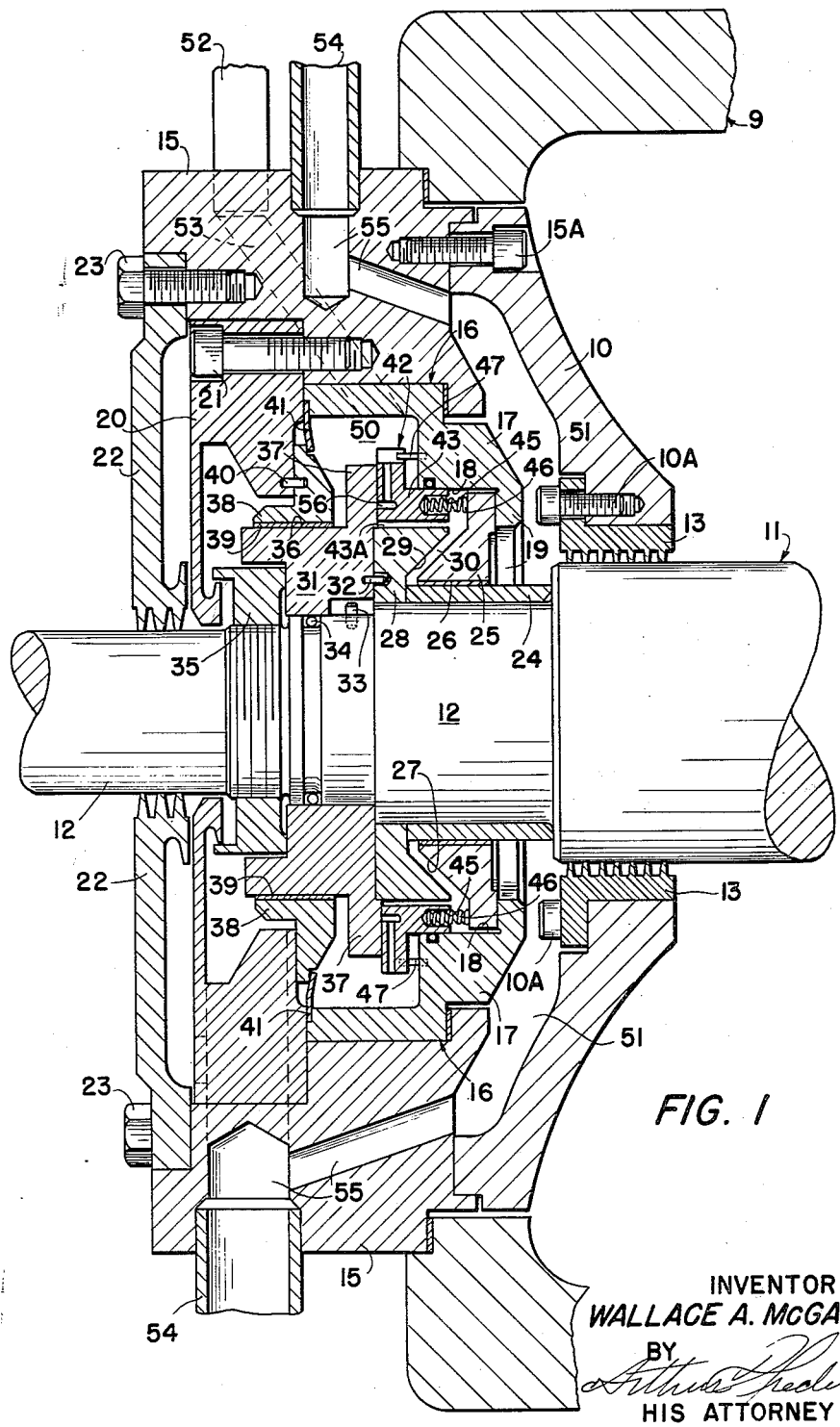
FIGURE 1 is a longitudinal sectional view through a portion of a casing and the fluid seal according to this invention.

Now referring to the drawings and more particularly to FIGURE 1, 10 designates an end wall of a casing or housing 9 containing a fluid, either liquid or gas, and through which housing projects a rotatably mounted shaft 11. The portion 12 of shaft 11 projecting through an opening in end wall 10 of casing 9 is formed to provide a plurality of successively smaller diameter sections. A sealing sleeve 13, which may be constructed of a deformable material, such as aluminum or babbitt, surrounds the shaft 11 and is secured within the opening in end wall 10 by means of bolts 10A (only two of which are shown in FIGURE 1).

The shaft seal, according to this invention, comprises a ring 15 which is disposed in spaced concentric relationship to shaft portion 12 and is secured to the outer surface of casing end wall 10 by means of a plurality of peripherally spaced bolts 15A (only one of which is shown in FIGURE 1). A ring 16, having an inwardly extending wall 17 which is formed to provide an annular bearing surface 18 and an annular flange 19, is secured to the inner peripheral surface of ring 15 in spaced coaxial relationship with the shaft portion 12. An inner cover member 20 is disposed in abutment against the end of ring 16, opposite wall 17, and is secured to and within ring 15 by a plurality of circumferentially spaced bolts 21 (only one of which is shown in FIGURE 1). A sleeve 24 serving to protect the shaft surface is shrink fitted to shaft portion 12 adjacent wall 17 of ring 16. A seal ring 25, having a wear sleeve 26 secured to the inner peripheral surface thereof, is disposed over sleeve 24. Seal ring 25 has a substantially flat inner surface, the outer periphery of which abuts flange 19 of ring 16 so as to allow ring 25 to center itself with sleeve 24. The opposite or outer surface of seal ring 25 has a frusto-conical surface 27. Adjacent sealing ring 25 and disposed in abutment against the end of a sleeve 24 is a ring member 28 which is provided with a frusto-conical recess 29 in the side adjacent seal ring 25, which recess is complementarily formed with respect to frusto-conical surface 27 of seal ring 25, and extends in spaced relationship with surface 27 to define with the latter a passageway 30 extending from a point near shaft portion 12 outwardly from the shaft toward bearing surface 18. Ring member 28 is disposed in abutment against the inner surface of a sealing collar 31 and is secured to the latter for conjoined rotation therewith by means of pins 32 (only one of which is shown in the drawings). Sealing collar 31 is keyed to shaft portion 12 for rotation with the latter by means of a radially extending pin 33 which projects from shaft portion 12 into an axial groove in sealing collar 31. Fluid leakage between the adjacent surfaces of sealing collar 31 and shaft portion 12 is prevented by an O-ring seal 34. Sealing collar 31 is held against axial movement on shaft portion 12 by a nut 35 which is turned upon a threaded section of shaft portion 12 and into abutment against sealing collar 31. Sealing collar 31 is formed to provide an annular bearing surface 36 and an annular flange 37, which flange extends outwardly from surface 36 to a point spaced from the inner peripheral surface of ring 16. A sealing ring 38, having a bearing sleeve 39 secured to the inner periphery thereof, is disposed in sealing relationship on bearing surface 36 of sealing collar 31 and secured against rotation by connection to inner cover member 20 through pins 40 (only one of which is shown in FIGURE 1). A spring plate 41 is secured along its outer peripheral portion between the adjacent surfaces of ring 16 and cover member 20, while the inner peripheral portion bears against a shoulder formed in the outer edge of sealing ring 38 to secure the latter against axial movement but permit slight radial movement to allow sealing ring 38 to center itself with respect to sealing collar 31.

Figure 3:
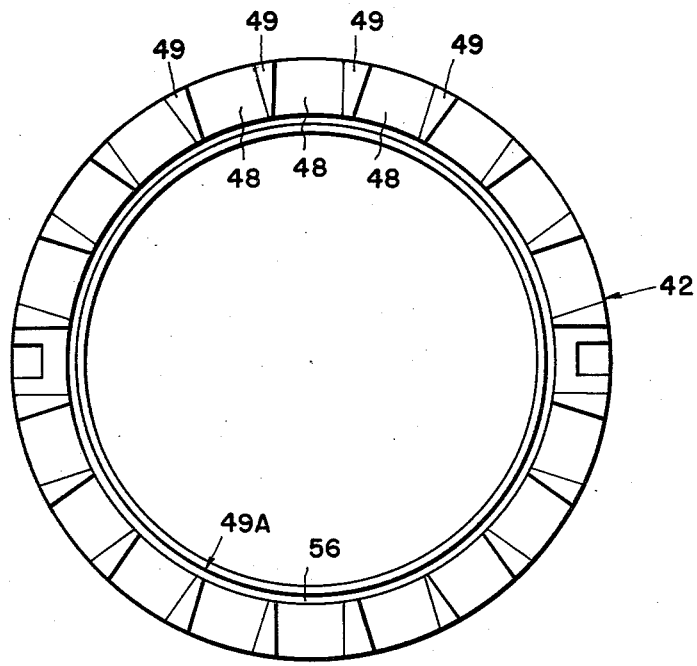
FIGURE 3 is a view in elevation of the contact ring forming a part of this invention.
Figure 4:
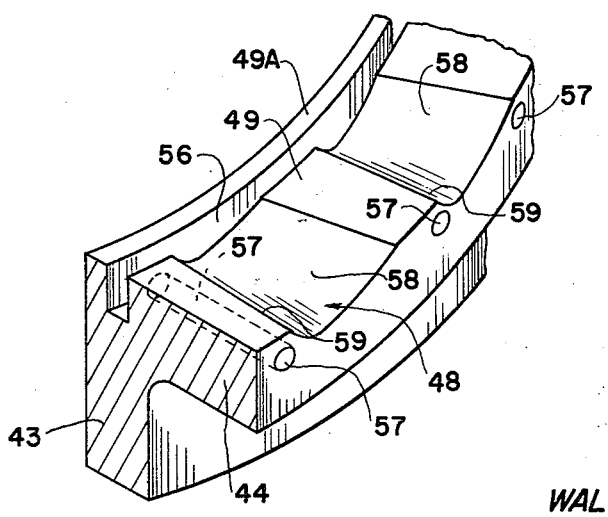
FIGURE 4 is a fragmentary view in perspective of the contact ring shown in FIGURE 2, somewhat enlarged.

Interposed between flange 37 of sealing collar 31 and wall 17 of ring member 16 is a contact ring 42. Contact ring 42 is substantially L-shaped in cross section and is positioned with one leg 43 slidably engaging bearing surface 18 of ring 16 and the other leg 44 abutting the flange portion 37 of sealing collar 31. Leg 43 is spaced from the outer peripheral surface of ring member 28 to define an annular passage 43A which communicates with passage 30. Contact ring 42 is provided with a plurality of peripherally spaced pockets 45 formed in leg 43. In each of these pockets 45 is disposed a coil spring 46 which bears at one end against the bottom of pockets 45 and at the other end engages seal ring 25 to bias contact ring 42 toward, and in fluid tight abutment against, the surface of flange 37. To guide contact ring 42 in its axial movement toward and away from sealing collar 31 and prevent rotation of the contact ring, a plurality of guide rods 47 (only two of which are shown in FIGURE 1) are secured in wall 17 of ring 16 and project therefrom to engage slots on the peripheral edge of contact ring 42. As best shown in FIGURES 3 and 4, the outer face of leg 44 of contact ring 42 is provided with a plurality of spaced recesses or depressions 48 which form a plurality of spaced sealing surfaces 49, the configuration and function of depressions 48 being hereinafter more fully described.

Figure 2:
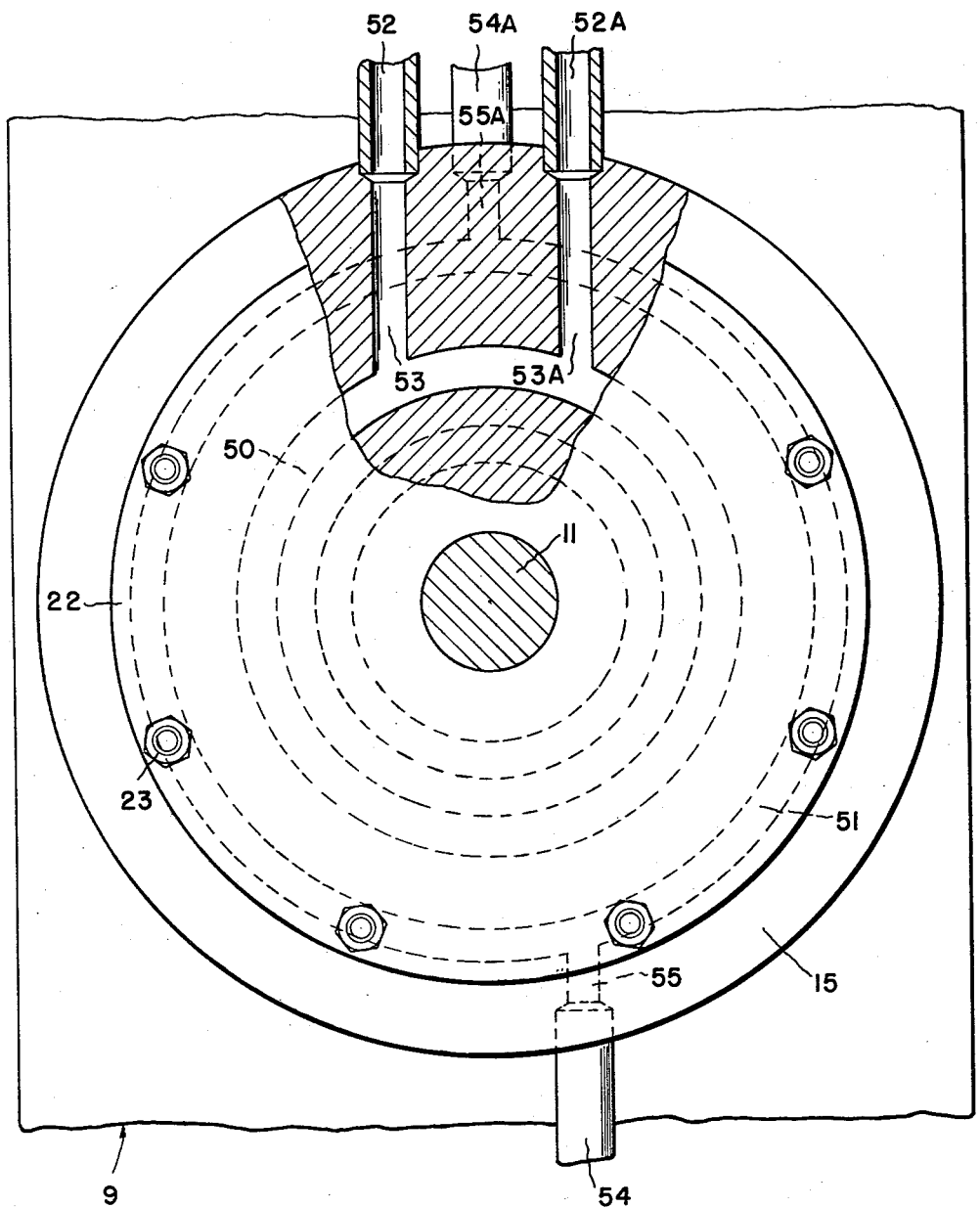
FIGURE 2 is an end elevational view of the assembly shown in FIGURE 1 as viewed from the left of FIGURE 1 and with parts broken away for illustration purposes.

Ring member 16, sealing collar 31, and seal ring 38 define therebetween a sealing fluid chamber 50. The inner surfaces of ring 15, wall 17 of ring member 16, and seal ring 25 define, along with the outer surface of end wall 10 of casing 9, a drain chamber 51. Ring 15 is provided with a sealing fluid inlet connection 52 which communicates with chamber 50 through a passageway 53 to deliver sealing fluid under pressure to chamber 50 from a suitable source of fluid under pressure (not shown). Similarly, an outlet connection 52A (see FIGURE 2) is connected to ring 15 and communicates with an outlet passageway 53A to receive sealing fluid from chamber 50 and to return the fluid to the source of sealing fluid (not shown). A fluid drain connection 54 is connected to bottom part of ring 15 and communicates with drain chamber 51 through passage 55 to pass fluid accumulating in chamber 51. To provide for gravity flow of fluid through drain connection 54, a vent 54A is connected to the top part of ring 15 and communicates with chamber 51 through passage 55A. As best shown in FIGURE 4, leg 44 of contact ring 42 is provided with an annular groove 56 and a plurality of radially extending passageways 57, each of which communicates at one end with groove 56 and at the other end with chamber 50. Each of the depressions 48 has an inclined surface 58 which slopes away from one sealing surface 49 to join a relatively sharply curved end wall 59 which extends to the next sealing surface 49. With the contact ring 42 in a position as shown in FIGURE 1 and sealing surfaces 49 abutting sealing collar 31, depressions 48 and the adjacent surface of sealing collar 31 form chambers which communicate with groove 56 to receive sealing fluid therefrom.

As can be readily seen, sealing fluid supplied to chamber 50, through inlet connection 52 and passage 53, flows through passageways 57 in contact ring 42 and into groove 56, and thence into each of the chambers formed by depressions 48 and sealing collar 31.

In operation of the apparatus according to this invention, sealing fluid, such as oil, is delivered to chamber 50 from a source of fluid (not shown) at a pressure higher than the pressure of the fluid within casing 9. The sealing fluid flows through inlet connection 52 and passageway 53 into chamber 50 and thence through passages 57 into groove 56. From groove 56, the fluid flows into the chambers defined by depressions 48 and the abutting surface of sealing collar 31 and is trapped therein. With the shaft 11 at rest or non-rotating condition, as shown in FIGURE 1, sealing fluid leakage from the seal chamber 50 through passageways 57 and recesses 48 into passageway 30 and thence through the clearance between sleeves 24 and 26 into drain chamber 51 is prevented by the sealing surfaces 49A of contact ring 42 abutting the adjacent surface of sealing collar 31. Thus, contact ring 42 and sealing collar 31 cooperate to form a mechanical seal when the shaft is not turning.

When the shaft 11 is rotated so as to operate a pumping device, such as an impeller in the casing, shaft portion 12 likewise rotates and also sealing collar 31 is rotated because it is keyed by pin 33 to the shaft portion 12. Ring member 28 being secured by pins 32 to sealing collar 31 is rotated upon rotation of the latter. Sealing ring 28 and sealing collar 31 rotate relative to seal rings 25 and 38 and contact ring 42 since the latter members are fixed against rotation and seal ring 28 and sealing collar 31 are connected to shaft portion 12 for rotation with the latter.

During period of initial rotation contact ring 42 maintains face contact with sealing collar 31 by reason of force from springs 46. However, rotation of sealing collar 31 adjacent to stationary face of contact ring 42 creates hydrodynamic forces resulting from the sealing fluid being driven by the rotation into the tapered chamber formed by depression 48 and the adjacent face of sealing collar 31. This hydrodynamic force results from an increase of pressure in the sealing fluid as it is driven by rotation of the adjacent face of sealing collar 31 into the tapered depression 48 toward sealing surface 49. This pressure produces a force component parallel to the axis of the shaft and opposite to the force exerted by springs 46. This axial force component, when of sufficient magnitude to overcome the biasing force of spring 46, causes contact ring 42 to move to the right as viewed in FIGURE 1, thus separating the sealing surface 49 of contact ring 42 from the adjacent face of sealing collar 31. Since, upon rotation of shaft 11, contact ring 42 moves out of engagement with the rotating sealing collar 31, a negligible wear between these members occurs. In addition, wear is minimized by reason of a thin film of sealing fluid which remains between sealing surface 49 of contact ring 42 and the adjacent face of sealing collar 31 after separation of the contact ring 42 and the sealing collar 31.

Upon separation of the contact ring 42 from matching surface of sealing collar 31, the sealing fluid supplied to chamber 50 can now pass by the sealing surface and fills the annular chambers 43A and 30 with sealing fluid. The pressure of this sealing fluid, since it is greater than that of the fluid to be sealed within casing 9, will pass through chamber 43A, 30 and through the clearance between sleeves 26 and 24 into the drain chamber 51, upon the initial rotation of shaft 12. However, rotation of ring member 28 causes a hydrodynamic pressure buildup in passageway 30 by reason of the relative rotation of the surface of the frusto-conical recess with respect to surface 27. Relative rotation tends to force the fluid within passageway 30 to flow in a direction outwardly from the axis of the shaft. This pressure build-up is proportional to the speed of rotation of the shaft and increases with speed tending to counterbalance the inward flow of sealing fluid into chamber 51 as described before. When the shaft speed reaches a predetermined value, the generated pressure within passageway 30 exactly equals and opposes the pressure of the supply fluid pressure within chamber 50 so that no leakage of sealing fluid through the chambers 43A and 30 into drain chamber 51 occurs.

When rotation of the shaft slows down and ceases, a reverse procedure occurs. During the slow down period the hydrodynamic pressure generated in chamber 30 gradually becomes less than the opposed pressure of the sealing fluid and leakage occurs from chamber 50 into chamber 51 as described before. Since the magnitude of the axial force component generated within depression 48 of sealing ring 42 varies as the speed of rotation of sealing collar 31, when the speed of rotation diminishes, contact ring 42 moves under the urging of springs 46 closer to sealing collar 31. When rotation of shaft 11 stops, springs 46 urge contact ring 42 in a direction to the left as viewed in FIGURE 1, to again cause the contact ring sealing surfaces 49A and 49 to abut sealing collar 31 and thus provide a mechanical seal with no further leakage of sealing fluid inward toward chamber 51 nor outward leakage of fluid contained within casing 9.

In view of the foregoing, it can be readily seen that the present invention provides a shaft seal for rotating shafts which is relatively simple in construction and effectively provides a mechanical seal when the shaft is not rotating and a fluid seal when the shaft is rotating. It is a shaft seal in which wear of the mechanical seal components is negligible since rubbing contact between the sealing surfaces of these components is minimal. Furthermore, the shaft seal according to this invention provides for negligible loss of sealing fluid.

Although but one embodiment of the present invention has been illustrated and described in detail, it is to be expressly understood that the invention is not limited thereto. Various changes can be made in the arrangement of parts without departing from the spirit and scope of the invention, as the same will now be understood by those skilled in the art. It is further to be understood that the invention is not to be construed to be limited to the use of the mechanical sealing components (sealing collar 31 and contact ring 42) in cooperation with the components (ring member 28 and seal ring 25) forming the fluid seal, although this is a preferred arrangement. Obviously, if only a mechanical seal is desired or necessary and sealing fluid leakage into drain chamber 51 and/or casing 9 is not objectionable, the fluid sealing components (ring 28 and seal ring 25) can be omitted without departing from the scope and spirit of this invention.

I claim:

1. A shaft seal for a shaft rotatably supported and extending through a wall of a housing containing a fluid, comprising a ring means disposed adjacent the exterior surface of the wall of said housing and connected to said shaft for rotation by the latter, means superimposed over said ring means and secured to said housing to define with said ring means a sealing fluid chamber, said fluid chamber being connected to a source of fluid under pressure to receive the same, said ring means having a seal face portion, a contact ring disposed adjacent said ring means and supported for slidable movement relative to said ring means and fixed against rotation, said contact ring being provided with one face having a plurality of depressions and sealing surfaces, biasing means acting against said contact ring to urge the sealing surfaces of the latter in fluid tight abutment against the seal face portion of said ring means to provide a fluid tight seal when the shaft is stationary, passage means for passing sealing fluid from said fluid chamber to said depressions, said depressions being so formed that upon rotation of said ring means a hydrodynamic pressure is generated in the fluid in the depressions having a force component directed against said contact ring to cause the latter to overcome said biasing means and move away from said ring means, a non-rotatable ring means disposed in close spaced relationship with a portion of said ring means adjacent the seal face portion to define therebetween an annular passageway extending radially outwardly from said shaft and communicating with the sealing fluid chamber when said contact ring moves away from the ring means so that a pressure substantially equal to the pressure of the fluid in the sealing fluid chamber is generated in the fluid in said annular passageway directed toward said sealing fluid chamber to thereby prevent flow of fluid from said sealing fluid chamber.

2. A shaft seal for a shaft rotatably supported and extending through a wall of a casing containing a fluid, comprising a means disposed around the portion of the shaft extending through the wall of the casing and secured to said casing, said means including a sealing fluid chamber for receiving sealing fluid under pressure, a ring means disposed in said fluid chamber and around the extending portion of said shaft and connected to the shaft for conjoined rotation by the latter, a mechanical seal means slidably supported relative to said ring means, means for urging said seal means in surface to surface abutment against said ring means to effect a fluid tight seal, said seal means including means for receiving and trapping sealing fluid from said sealing fluid chamber and producing a hydrodynamic force in said trapped fluid counter to said biasing means upon rotation of said ring means to cause the seal means to move away from the ring means, a non-rotatable ring means disposed in close spaced relationship with a portion of said ring means to define with the latter an annular passageway extending radially outwardly from said shaft and communicating with said sealing fluid chamber to receive fluid therein when said seal means moves away from the ring means so that a pressure substantially equal to the pressure of the fluid in the sealing fluid chamber is generated in the fluid in said annular passageway directed toward said sealing fluid chamber to thereby prevent flow of fluid from said sealing fluid chamber.

3. The apparatus of claim 2 wherein the seal means including means for receiving and trapping sealing fluid comprises a ring having a seal face in which are disposed a plurality of circumferentially spaced depressions.

4. A shaft seal for a shaft rotatably supported and having a portion extending through a wall of a housing containing a fluid, comprising a ring means disposed around the extending portion of said shaft and adjacent the exterior surface of the wall of said housing and connected to said shaft for rotation by the latter, means superimposed over said ring means and secured to said housing to define with said ring means a sealing fluid chamber, said fluid chamber being connected to a source of fluid under pressure to receive the same, said ring means having a seal face and a frusto-conical recess, a non-rotatable ring member having a frusto-conical face complementary to said frusto-conical recess, said ring member being disposed around the extending portion of said shaft and with the frusto-conical face thereof positioned in close spaced relationship to said frusto-conical recess to thereby define a passageway, a contact ring disposed adjacent said ring means and supported for slidable movement relative to said ring means and fixed against rotation, said contact ring being provided with one face having a plurality of depressions and sealing surfaces, means for biasing said contact ring in a direction toward said ring means with the sealing surfaces of the contact ring in fluid tight abutment against the seal face of the ring means to thereby effect a fluid tight seal when the shaft is stationary, passage means for passing sealing fluid from said fluid chamber to said depressions, said depressions being so formed that upon rotation of said ring means a hydrodynamic pressure is generated in the fluid in the depressions having a force component directed against said contact ring to cause slidable movement of the latter away from said ring means, and other passage means communicating said passageway formed by said frusto-conical surfaces with the fluid chamber when said contact ring moves out of abutment with said ring means.

References Cited in the file of this patent
UNITED STATES PATENTS 2,265,953     Mortensen et al. _____ Dec. 9, 1941

FOREIGN PATENTS 872,364     Great Britain _____ July 5, 1961